US006978042B1

(12) United States Patent
Shin et al.

(10) Patent No.: US 6,978,042 B1
(45) Date of Patent: Dec. 20, 2005

(54) COLOR IMAGE SEGMENTATION METHOD

(75) Inventors: Hyun-doo Shin, Sungnam (KR); Yang-Lim Choi, Paldal-gu (KR); Bangalore S. Manjunath, Santa Barbara, CA (US); Yining Deng, Santa Barbara, CA (US)

(73) Assignees: The Regents of the University of California, Oakland, CA (US); Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/556,328

(22) Filed: Apr. 24, 2000

Related U.S. Application Data (60) Provisional application No. 60/130,643, filed on Apr. 23, 1999.

(51) Int. Cl.$^7$ ............................................. G06K 9/34
(52) U.S. Cl. .................... 382/164; 382/165; 382/171; 382/275; 358/3.26; 358/3.27
(58) Field of Search ...................... 382/162, 163, 382/164, 165, 166, 167, 169, 170, 171, 172, 382/180, 190, 218, 219, 220, 224, 251, 252, 382/269, 274, 275, 282; 358/2.1, 512, 515, 358/518, 3.26, 3.27, 463

(56) References Cited

U.S. PATENT DOCUMENTS

| 5,206,918 | A | * | 4/1993 | Levene ........................ 382/167 |
| 5,432,893 | A | * | 7/1995 | Blasubramanian et al. . 345/600 |
| 5,544,284 | A | * | 8/1996 | Allebach et al. ............ 345/603 |
| 5,767,992 | A | * | 6/1998 | Tanaka et al. ............... 358/520 |
| 5,768,412 | A | * | 6/1998 | Mitsuyama et al. ........ 382/173 |
| 5,850,475 | A | * | 12/1998 | Kasao ......................... 382/173 |
| 6,047,085 | A | * | 4/2000 | Sato et al. ................... 382/165 |
| 6,088,137 | A | * | 7/2000 | Tomizawa ................... 358/538 |
| 6,124,945 | A | * | 9/2000 | Ishihara et al. .............. 358/1.9 |
| 6,134,347 | A | * | 10/2000 | Niwamoto ................... 382/166 |
| 6,184,940 | B1 | * | 2/2001 | Sano ........................... 348/655 |
| 6,266,442 | B1 | * | 7/2001 | Laumeyetr et al. ......... 382/190 |
| 6,330,008 | B1 | * | 12/2001 | Razdow et al. ............. 345/772 |
| 6,332,036 | B1 | * | 12/2001 | Sakamoto ................... 382/162 |
| 6,351,556 | B1 | * | 2/2002 | Loui et al. .................. 382/164 |
| 6,353,700 | B1 | * | 3/2002 | Zhou .......................... 386/68 |
| 6,452,970 | B1 | * | 9/2002 | Kaup ....................... 375/240.1 |
| 6,587,222 | B2 | * | 7/2003 | Nishikawa .................. 358/1.9 |

FOREIGN PATENT DOCUMENTS

| CN | 1209894 A | 3/1999 | |
| KR | 0082010 | 11/1999 | ............ G06T 9/00 |

OTHER PUBLICATIONS

S. Ji, et al.; "Image Segmentation of Color Image Based On Region Coherency"; Processing: 1998; vol. 1; pp. 80-83.
First Office Action for Application No. 00803603.9, The Paten Office of the People's Republic of China, Nov. 7, 2003.

* cited by examiner

*Primary Examiner*—Bhavesh M. Mehta
*Assistant Examiner*—Yosef Kassa
(74) *Attorney, Agent, or Firm*—Sughrue Mion, PLLC (57) ABSTRACT

A color image segmentation method is provided. The color image segmentation method includes the steps of: (a) calculating a first value representing the degree of difference between a pixel and the color of peripheral pixels based a plurality of pixel values of an input image; (b) obtaining a converted image by converting the first calculated value into a value of a predetermined scale; and (c) segmenting the converted image. According to the color image segmentation method, an effective and an automatic segmentation is possible, and a segmentation speed is high even when segmenting an image containing much noise.

48 Claims, 5 Drawing Sheets

CLASS-MAP 1
J=1.720

CLASS-MAP 2
J=0

CLASS-MAP 3
J=0.855

SEGMENTED CLASS–MAP 1
$J_+ = 0$, $J_* = 0$, $J_o = 0$
$\bar{J} = 0$

SEGMENTED CLASS–MAP 3
$J_+ = 0$, $J_{(*,o)} = 0.011$
$\bar{J} = 0.05$

FIG. 4A

CONTAINER, FRAME 0      SEGMENTED IMAGE $\bar{J}=0.232$      $\bar{J}=0.071$

FIG. 4B

FOREMAN, FRAME 4      SEGMENTED IMAGE $\bar{J}=0.238$      $\bar{J}=0.105$

FIG. 4C

COAST, FRAME 200      SEGMENTED IMAGE $\bar{J}=0.494$      $\bar{J}=0.093$

FIG. 4D

FLOWER GARDEN,
FRAME 0
$\bar{J}=0.435$

SEGMENTED IMAGE
$\bar{J}=0.088$

FIG. 4E

MOTHER AND DAUGHTER,
FRAME 0
$\bar{J}=0.438$

SEGMENTED IMAGE
$\bar{J}=0.061$

COLOR IMAGE SEGMENTATION METHOD

This is a non-provisional application claiming benefit of provisional application 60/130,643 filed on Apr. 23, 1999.

BACKGROUND OF THE INVENTION

1. Field of the Invention

The present invention relates to a color image segmentation method, and more particularly, to a color image segmentation method for segmenting a color image.

2. Description of the Related Art

The segmentation of a color image is a very important part of digital image processing and its applications. A first type of conventional color image segmentation method has a problem in that it is not easy to segment a color image containing texture. A second type of conventional color image segmentation method for performing an automatic segmentation does not perform well when used to process an input image containing noise. A third type of conventional color image segmentation method requires a user to prepare the image by manual segmentation. Though this third method produces satisfactory results even with respect to an input image containing noise, an automatic segmentation is not performed, therefore, this third method requires significant processing time.

SUMMARY OF THE INVENTION

To solve the above problems, it is an object of the present invention to provide a color image segmentation method capable of automatically segmenting a color image containing texture and performing well even with respect to an input image containing noise.

It is another object of the present invention is to provide a color image processing method containing the color image segmentation method.

It is still another object of the present invention is to provide a medium in which a computer program performing the color image segmentation method is stored.

Accordingly, to achieve the above objects, according to one aspect of the present invention, there is provided a color image segmentation method. The color image segmentation method comprises the steps of: (a) calculating a first value representing a degree of difference between the color of a pixel and peripheral pixels based on a plurality of pixel values of an input image; (b) obtaining a converted image by converting the first value into a value of a predetermined scale; and (c) segmenting the converted image. Preferably, the step (c) segments the converted image based on a region growing method.

It is preferable that the color image segmentation method, prior to the step (a), further comprises the step of (p-a) quantizing pixel values of an image into a predetermined number of representative pixel values; wherein the pixel values are quantized pixel values.

The representative pixel values preferably consist of 10–20 values.

It is preferable that the color image segmentation method, prior to the step (a), further comprises the steps of: (p-a-1) defining a window containing a center pixel; and (p-a-2) calculating the first value representing the degree of difference from the color of peripheral pixels with respect to pixels in the defined window.

It is also preferable that the step (a) comprises the steps of: (a-1) defining a window B which is centered at a pixel p and has a size of d×d where d is a positive integer preferably between 3 and 10, inclusive; and (a-2) classifying a pixel position z into a C number of classes when i is a number between 1 and C, and Z is a set of all pixels in the window B; and (a-3) obtaining a J-value with respect to each pixel in a class-map as:

$$J = \frac{S_B}{S_W} = \frac{S_T - S_W}{S_W}$$

where $m_i$ is the average of positions of $N_i$ data points in class $Z_i$, $$S_T = \sum_{z \in Z} \|z - m\|^2 \text{ and } S_W = \sum_{i=1}^{C} S_i = \sum_{i=1}^{C} \sum_{z \in Z_i} \|z - m_i\|^2$$

The predetermined scale is preferably a gray scale having values between 0 and 255.

In order to achieve the above object, according to another aspect of the present invention, there is provided a color image segmentation method. The color image segmentation method comprises the steps of: (a) quantizing pixel values of an image into a predetermined number of representative pixel values; (b) calculating a value representing a degree of difference between the color of pixels in a predetermined size window using quantized representative pixel values; (c) obtaining a converted image by converting the calculated value into a value of a predetermined scale; and (d) segmenting the converted image using a segmentation method based on a region growing method.

In order to achieve another object, there is provided an object-based color image processing method for processing a color image according to a color image segmentation method. The color image segmentation method comprises the steps of: (a) calculating a predetermined value representing a degree of difference between a pixel and the color of peripheral pixels based on a plurality pixel values of an input image; (b) obtaining a converted image by converting a calculated value into a value of a predetermined scale; and (c) segmenting the converted image.

In order to achieve still another object, there is provided a medium for storing program codes performing a color image segmentation method for segmenting a color image into a plurality of regions. The medium includes computer readable program means for: (a) quantizing pixel values of an image into a predetermined number of representative pixel values; (b) calculating a value representing a degree of difference between the color of pixels in a predetermined size window using quantized representative pixel values; (c) obtaining a converted image by converting a calculated value into a value of a predetermined scale; and (d) segmenting the converted image using a segmentation method based on a region growing method.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
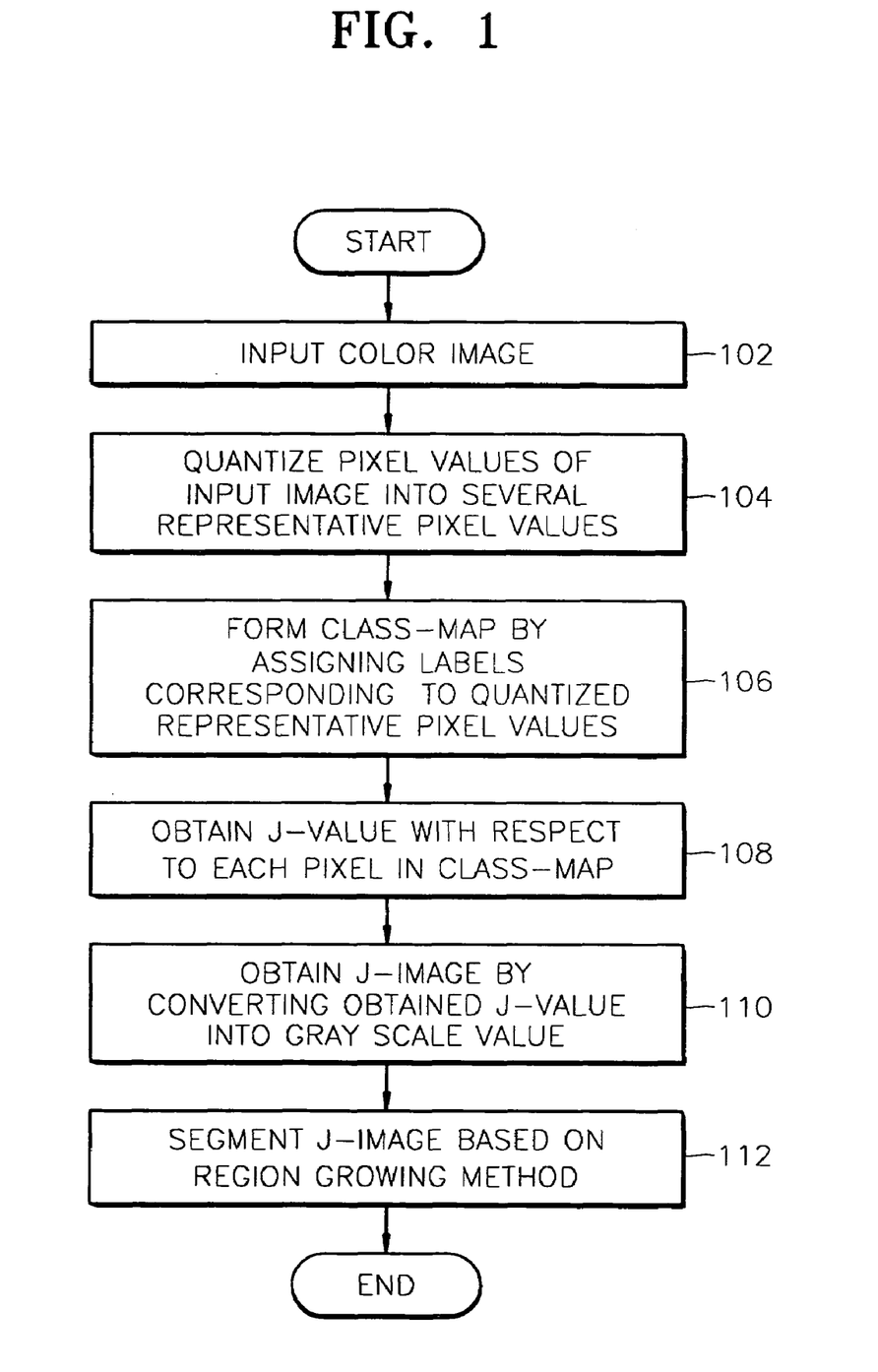
FIG. 1 is a flowchart illustrating a color image segmentation method according to a preferred embodiment of the present invention.

Referring to FIG. 1, which illustrates a flowchart illustrating a color image segmentation method according to a preferred embodiment of the present invention, a color image is input (step 102), and pixel values of an input image are quantized into several representative pixel values (step 104). In order to classify an image in natural scenes, the representative pixel values consist of 10–20 quantized values. In this embodiment, quantization is performed using three representative pixel values for convenience of explanation. Next, a class-map is formed by assigning labels corresponding to quantized representative pixel values (step 106).

More preferably, a window centered at a pixel to be processed in an entire image is defined. That is, when d is a positive integer, preferably between 3 and 10 (inclusive), a window B which is centered at a pixel p or at approximately pixel p and has a size of d×d, is defined. Also, an assumption is made that i is a number between 1 and C, and Z is a set of all the pixels in the window B. An assumption is made that Z is classified into a C number of classes. In other words, Z is classified into C classes $Z_i$, i=1 . . . C.

Also, an assumption is made that a specific class variable $m_i$ is the average of positions of $N_i$ data points in class $Z_i$ as:

$$m_i = \frac{1}{N_i} \sum_{z \in Z_i} z \quad \text{(equation 1)}$$

The more general counterpart of $m_i$ may be represented by m.

Also, $S_T$ and $S_W$ are defined by:

$$S_T = \sum_{z \in Z} \|z - m\|^2 \text{ and} \quad \text{(equation 2)}$$

$$S_W = \sum_{i=1}^{C} S_i = \sum_{i=1}^{C} \sum_{z \in Z_i} \|z - m_i\|^2 \quad \text{(equation 3)}$$

respectively.

Next, a J-value with respect to each pixel in a class-map is obtained (step 108). The J-value with respect to each pixel in the class-map is defined as follows:

$$J = \frac{S_B}{S_W} = \frac{S_T - S_W}{S_W} \quad \text{(equation 4)}$$

The J-values obtained by equation 4 are converted into a gray scale value between 0 and 255, so that a gray scale image having values and capable of being referred to as a J-image is obtained (step 110). The J-image has the same form as a three-dimensional topographic map containing valleys and mountains that actually represent region centers and region boundaries, respectively.

Lastly, the J-image is segmented based on a region growing method (step 112). The region growing method is known to one of ordinary skill in the art as a method used for the segmentation of a digital image, therefore, an explanation thereof is not given.

Figure 2A:
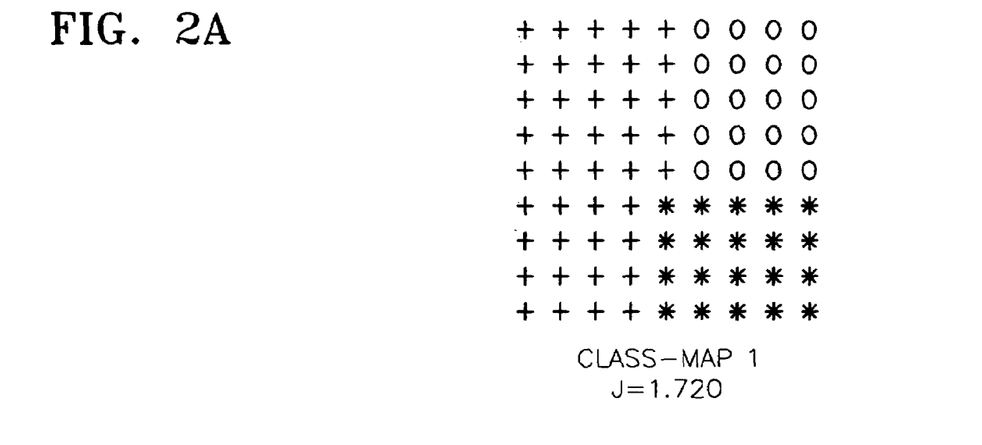
FIGS. 2A through 2C illustrate class-maps and J-values formed according to a color image segmentation method of FIG. 1.
Figure 2B:
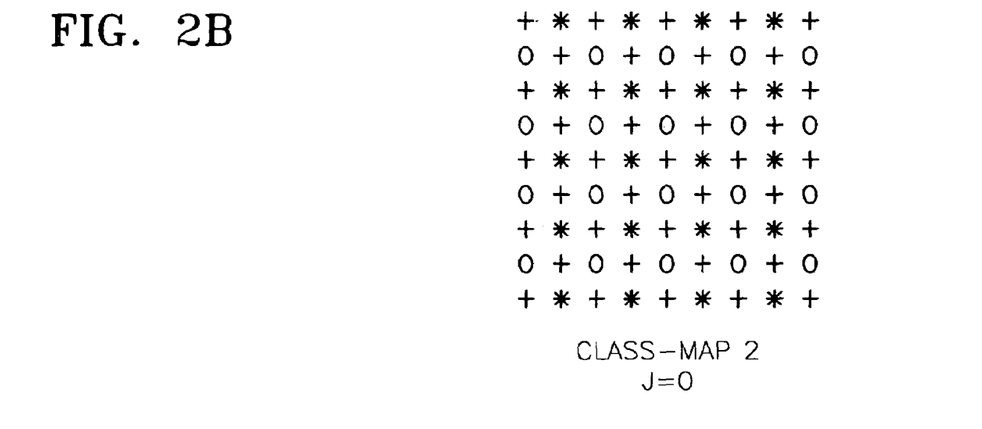
Figure 2C:
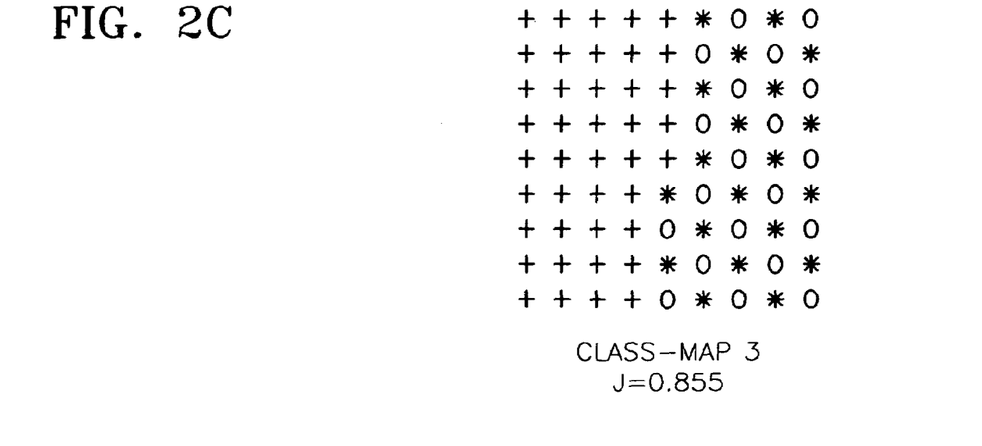

FIGS. 2A through 2C illustrate class-maps and J-values formed according to a color image segmentation method of FIG. 1. The J-value at the center pixel is 1.720 in the class-map of FIG. 2A, and in the class-map of FIG. 2B, the J-value at the center pixel is 0, and in the class-map of FIG. 2C, the J-value at the center pixel is obtained as 0.855. In the class-map of FIG. 2A, in the case where pixels represented as + are located at the left of the center pixel, pixels represented as 0 are located at the right and upper portions relative to the center pixel, and pixels represented as * are located to the bottom lower portions relative to the center pixel, the pixels form regions most clearly. Here, the J-value is 1.720, a relative large value. By contrast, in the class-map of FIG. 2B, in the case where the pixels represented as +, the pixels represented as 0, and the pixels represented as * are uniformly distributed and do not readily form regions, the J-value is 0. Furthermore, in the class-map of FIG. 2C, in the case where the pixels represented as + are located at the left of the center pixel form regions, but the pixels represented as 0 and * to the right of the center pixel do not readily form regions, the J-value is 0.855. As is apparent from the previous discussion, the larger the J-value at the center pixel, the more likely that the pixel is near a region boundary. Therefore, a segmentation based on the region growing method by using this point can be performed.

Figure 3A:
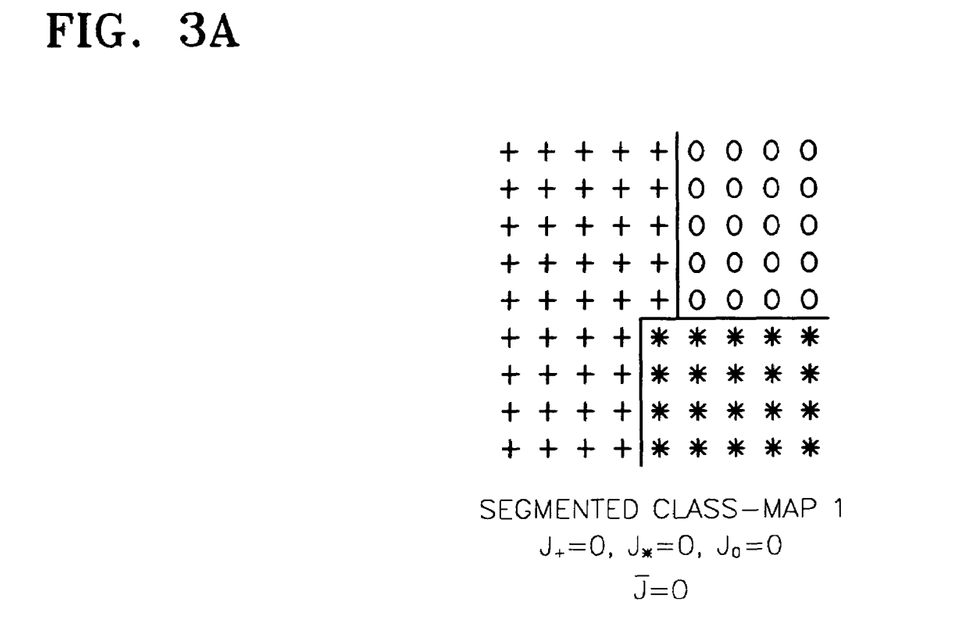
FIGS. 3A and 3B illustrate segmented class-maps.
Figure 3B:
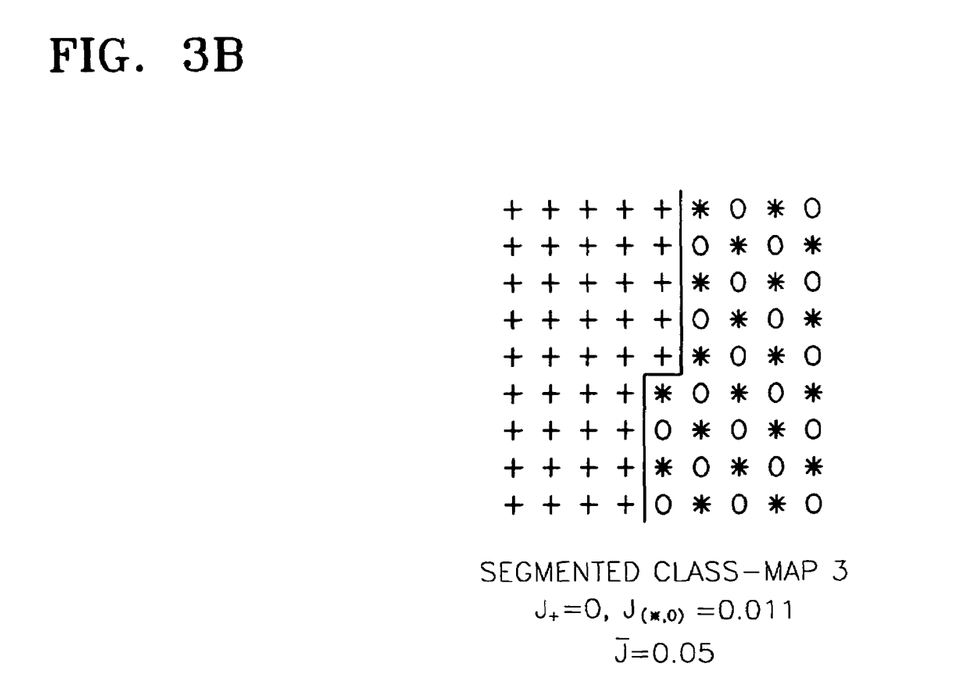

FIGS. 3A and 3B illustrate segmented class-maps.

It is necessary to check whether segmentation has been performed well with respect to each region in the segmented class-maps and to represent the same as quantized values. For this purpose, when $J_k$ is the J-value obtained with respect to a k-region, and $M_k$ is the number of pixel points of a k-th region, and N is the total number of pixel points in the class-map, the averaged J-value is calculated as:

$$\bar{J} = \frac{1}{N} \sum_k M_k J_k \quad \text{(equation 5)}$$

The calculated values are represented as quantized values representative of whether a segmentation is performed well with respect to each region in the segmented class-maps or not.

In the case of the segmented class-map shown in FIG. 3A, the averaged J-value is 0, on the other hand, in the case of the segmented class-map shown in FIG. 3B, the averaged J-value is 0.05. That is, in the case of regions of a fixed number, especially in the case of better segmentation, the averaged J-value is small. This occurs because the region contains a few uniformly distributed color classes in the case where a region is well segmented. Accordingly, the averaged J-value is small.

Figure 4A:
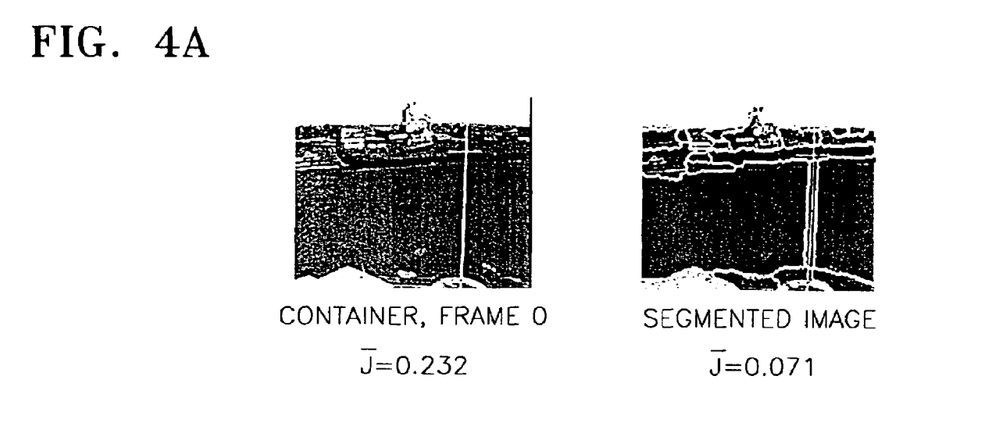
FIG. 4A illustrates one image frame of a "container" as a test image and a test image segmented by the color image segmentation method according to the present invention.

FIG. 4A illustrates one image frame of a "container" as a test image and a test image segmented by the color image segmentation method according to the present invention. Referring to FIG. 4A, J of an image before segmentation is 0.232, but, $\bar{J}$ of the image after segmentation is 0.071. Also, it is evident that regions in the test image are well segmented.

Figure 4B:
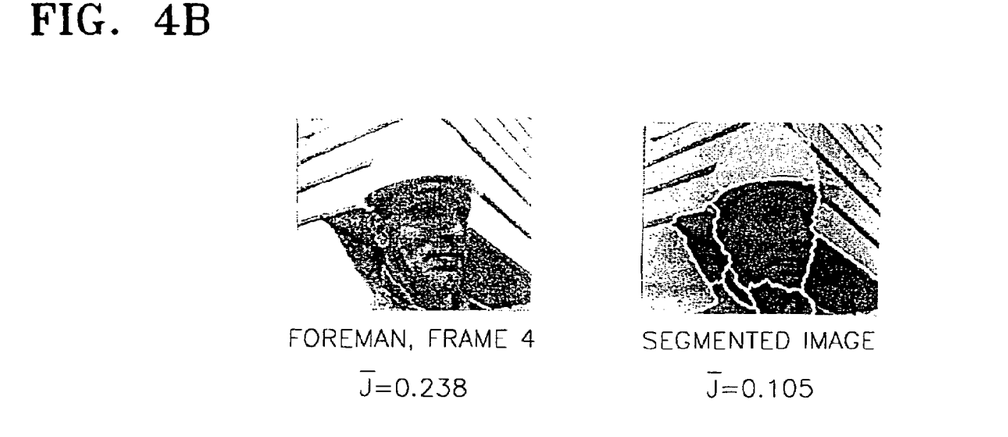
FIG. 4B illustrates one image frame of a "foreman" as a test image and a test image segmented by the color image segmentation method according to the present invention.

FIG. 4B illustrates one image frame of a "foreman" as a test image and a test image segmented by the color image segmentation method according to the present invention. Referring to FIG. 4B, J of an image before segmentation is 0.238, but $\bar{J}$ of the image after segmentation is 0.105. Also, it is evident that regions in the test image are well segmented.

Figure 4C:
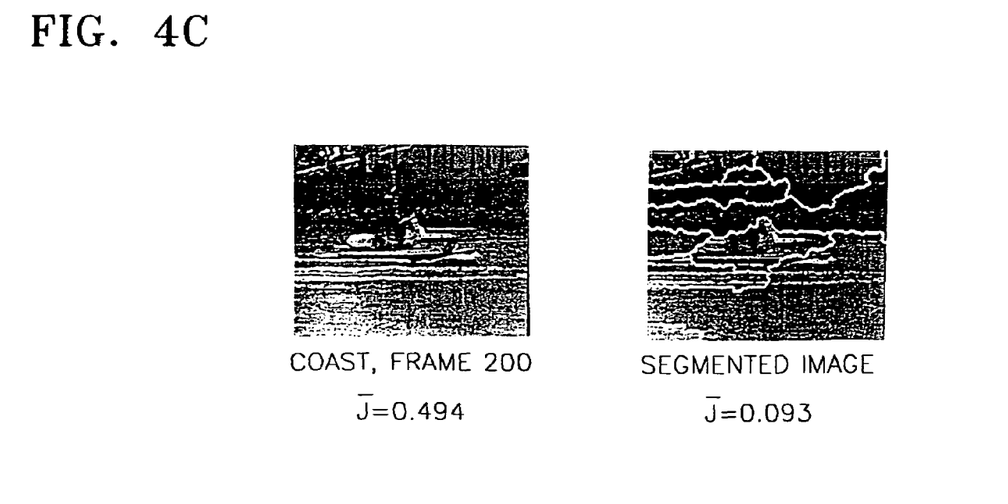
FIG. 4C illustrates one image frame of a "coast" as a test image and a test image segmented by the color image segmentation method according to the present invention.

FIG. 4C illustrates one image frame of a "coast" as a test image and a test image segmented by the color image segmentation method according to the present invention. Referring to FIG. 4C, J of an image before segmentation is 0.494, but $\bar{J}$ of the image after segmentation is 0.093. Also, it is evident that regions in the test image are well segmented.

Figure 4D:
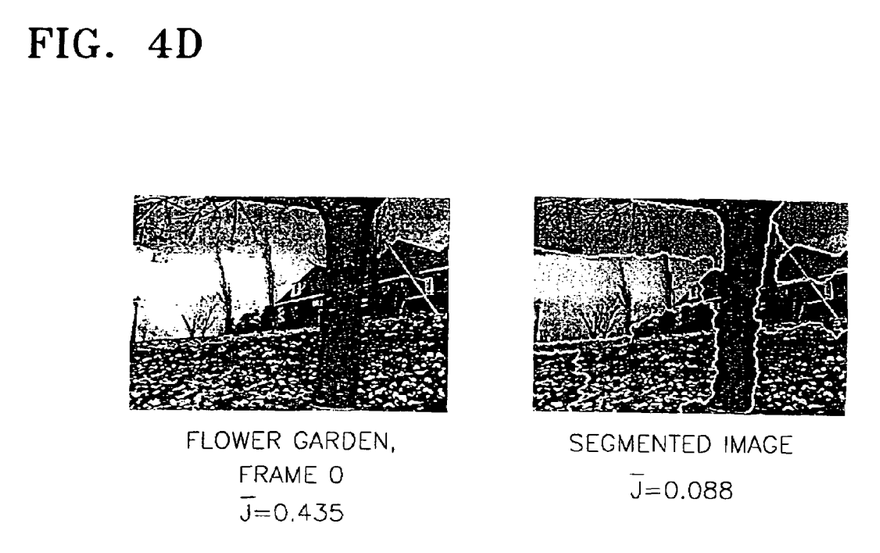
FIG. 4D illustrates one image frame of a "flower garden" as a test image and a test image segmented by the color image segmentation method according to the present invention.

FIG. 4D illustrates one image frame of a "flower garden" as a test image and a test image segmented by the color image segmentation method according to the present invention. Referring to FIG. 4D, J of an image before segmentation is 0.435, but $\bar{J}$ of the image after segmentation is 0.088. Also, it is evident that regions in the test image are well segmented.

Figure 4E:
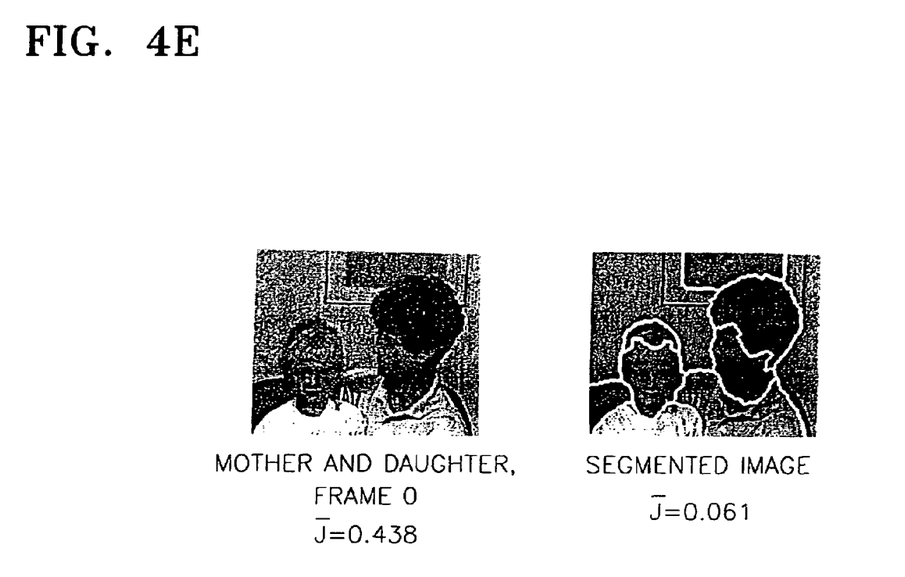
FIG. 4E illustrates one image frame of a "mother and daughter" as a test image and a test image segmented by the color image segmentation method according to the present invention.

FIG. 4E illustrates one image frame of a "mother and daughter" as a test image and a test image segmented by the color image segmentation method according to the present invention. Referring to FIG. 4E, J of an image before segmentation is 0.438, but $\bar{J}$ of the image after segmentation is 0.061. Also, it is evident that regions in the test image are well segmented.

That is, as described referring to FIGS. 4A through 4E, $\bar{J}$ of the image segmented by the color image segmentation method according to the present invention is smaller than J of the image before segmentation.

In the above color image segmentation method according to the present invention, a robust segmentation is possible even when segmenting an image containing much noise or texture. Furthermore, an automatic segmentation is possible without user's assistance, such as segmentation performed manually by a user. Therefore, the segmentation can be performed rapidly. The color image segmentation method can be applied to object-based image processing such as that used in MPEG-7.

In the above embodiment, the calculation of specific functions are explained as examples, however, this is only for purposes of explanation. The scope of the present invention defined in the appended claims is not limited to the embodiment, and it is obvious that one of ordinary skill in the art can use another modified function representing the degree of difference from the color of peripheral pixels.

For instance, in equation 3, $S_W$ may be represented by $$S_W = \sum_{i=1}^{C} S_i = \sum_{z \in Z_i} \|z - m_i\|^2$$

Furthermore, the above color image segmentation method can be embodied in a computer program. Codes and code segments comprising the program can be easily inferred by a skilled computer programmer in the art. Also, the program can be stored in computer readable media, read and executed by a computer, and it can thereby realize the color image processing method. The media can include magnetic media, optical media, and carrier waves, or other media used for machine-readable forms.

As described above, according to the present invention, a color image can be automatically segmented without a user's assistance and is robust and effective even with respect to an input image containing noise.

What is claimed is:

1. A color image segmentation method for segmenting a color image into a plurality of regions, comprising the steps of:
   (a) calculating a first value representing a degree of difference between a pixel and peripheral pixels from the color of peripheral pixels based on a plurality of pixel values of an input image, wherein the color includes levels of one color,
   (b) obtaining a converted image by converting the first value into a value of a predetermined scale, and
   (c) segmenting the converted image based on a region growing method.

2. The color image segmentation method according to at least one of claim 1, wherein prior to the step (a), said method further comprises the step of (p-a) quantizing pixel values of the input image into a predetermined number of representative quantized pixel values.

3. The color image segmentation method according to claim 2, wherein the representative pixel values consist of 10–20 values.

4. The color image segmentation method according to claim 3, wherein the step (a) comprises the steps of:
   (a-1) defining a window which is centered at a pixel p and has a size of d×d when d is a positive integer, said window having a set of pixels Z; and
   (a-2) classifying a pixel position of each pixel of set Z into one of a C number of classes when i is a number between I and C, and
   (a-3) obtaining a J-value, as said first value, with respect to each pixel in a class-map as:

$$J = \frac{S_B}{S_W} = \frac{S_T - S_W}{S_W}$$

where $m_i$ is an average of positions of $N_i$ data points in class $Z_i$, i=1 to C, and $$S_T = \sum_{z \in Z} \|z - m\|^2 \text{ and } S_W = \sum_{i=1}^{C} S_i = \sum_{i=1}^{C} \sum_{z \in Z_i} \|z - m_i\|^2.$$

5. The color image segmentation method according to claim 4, wherein d is an integer inclusive of and between 3 and 10.

6. The color image segmentation method according to claim 5, wherein the predetermined scale is a gray scale having values between 0 and 255.

7. The color image segmentation method according to claim 4, wherein the predetermined scale is a gray scale having values between 0 and 255.

8. The color image segmentation method according to claim 3, wherein the predetermined scale is a gray scale having values between 0 and 255.

9. The color image segmentation method according to claim 3, wherein prior to the step (a), said method further comprises the steps of:
(p-a-1) defining a window containing a center pixel; and
wherein said step (a) further comprises calculating a second value representing the degree of difference between a pixel and peripheral pixels from the color of peripheral pixels with respect to pixels in the defined window.

10. The color image segmentation method according to claim 9, wherein in said step (p-a-1), said window has a size of d×d when d is a positive integer, said window having a set of pixels Z, and the step (a) comprises the steps of:
(a-1) classifying a pixel position of each pixel of set Z into one of a C number of s classes when i is a number between 1 and C, and
(a-2) obtaining a J-value, as said first value, with respect to each pixel in a class-map as:

$$J = \frac{S_B}{S_W} = \frac{S_T - S_W}{S_W}$$

where $m_i$ as said second value is an average of positions of Ni data points in class $Z_i$, i=1 to C, and $$S_T = \sum_{z \in Z} \|z - m\|^2 \text{ and } S_W \sum_{i=1}^{C} S_i = \sum_{i=1}^{C} \sum_{z \in Z_i} \|z - m_i\|^2.$$

11. The color image segmentation method according to claim 10, wherein d is an integer inclusive of and between 3 and 10.

12. The color image segmentation method according to claim 11, wherein the predetermined scale is a gray scale having values between 0 and 255.

13. The color image segmentation method according to claim 10, wherein the predetermined scale is a gray scale having values between 0 and 255.

14. The color image segmentation method according to claim 9, wherein the predetermined scale is a gray scale having values between 0 and 255.

15. The color image segmentation method according to claim 2, wherein prior to the step (a), said method further comprises the steps of:
(p-a-1) defining a window containing a center pixel; and
wherein said step (a) further comprises calculating a second value representing the degree of difference between a pixel and peripheral pixels from the color of peripheral pixels with respect to pixels in the defined window.

16. The color image segmentation method according to claim 15, wherein in said step (p-a-1), said window has a size of d×d when d is a positive integer, said window having a set of pixels Z, and the step (a) comprises the steps of:
(a-1) classifying a pixel position of each pixel of set Z into one of a C number of 26 classes when i is a number between 1 and C, and
(a-2) obtaining a J-value, as said first value, with respect to each pixel in a class-map as:

$$J = \frac{S_B}{S_W} = \frac{S_T - S_W}{S_W}$$

where $m_i$ as said second value, is an average of positions of $N_i$ data points in class $Z_i$, i=1 to C, and $$S_T = \sum_{z \in Z} \|z - m\|^2 \text{ and } S_W \sum_{i=1}^{C} S_i = \sum_{i=1}^{C} \sum_{z \in Z_i} \|z - m_i\|^2.$$

17. The color image segmentation method according to claim 16, wherein d is an integer inclusive of and between 3 and 10.

18. The color image segmentation method according to claim 17, wherein the predetermined scale is a gray scale having values between 0 and 255.

19. The color image segmentation method according to claim 16, wherein the predetermined scale is a gray scale having values between 0 and 255.

20. The color image segmentation method according to claim 15, wherein the predetermined scale is a gray scale having values between 0 and 255.

21. The color image segmentation method according to claim 2, wherein the step (a) comprises the steps of:
(a-1) defining a window which is centered at a pixel p and has a size of d×d when d is a positive integer, said window having a set of pixels Z; and
(a-2) classifying a pixel position of each pixel of set Z into one of a C number of classes when i is a number between 1 and C; and
(a-3) obtaining a J-value, as said first value, with respect to each pixel in a class-map as:

$$J = \frac{S_B}{S_W} = \frac{S_T - S_W}{S_W}$$

where $m_i$ is an average of positions of $N_i$ data points in class $Z_i$, i=1 to C, and $$S_T = \sum_{z \in Z} \|z - m\|^2 \text{ and } S_W = \sum_{i=1}^{C} S_i = \sum_{i=1}^{C} \sum_{z \in Z_i} \|z - m_i\|^2.$$

22. The color image segmentation method according to claim 21, wherein d is an integer inclusive of and between 3 and 10.

23. The color image segmentation method according to claim 22, wherein the predetermined scale is a gray scale having values between 0 and 255.

24. The color image segmentation method according to claim 21, wherein the predetermined scale is a gray scale having values between 0 and 255.

25. The color image segmentation method according to claim 2, wherein the predetermined scale is a gray scale having values between 0 and 255.

26. The color image segmentation method according to claim 1, wherein prior to the step (a), said method further comprises the steps of:
   (p-a-1) defining a window containing a center pixel; and
   wherein said step (a) further comprises calculating a second value representing the degree of difference between a pixel and peripheral pixels from the color of peripheral pixels with respect to pixels in the defined window.

27. The color image segmentation method according to claim 26, wherein in said step (p-a-1), said window has a size of d×d when d is a positive integer, said window having a set of pixels Z, and the step (a) comprises the steps of:
   (a-1) classifying a pixel position of each pixel of set Z into one of a C number of classes when i is a number between 1 and C, and
   (a-2) obtaining a J-value, as said first value, with respect to each pixel in a class-map as:

$$J = \frac{S_B}{S_W} = \frac{S_T - S_W}{S_W}$$

where m; as said second value is an average of positions of Ni data points in class $Z_i$, i=1 to C, and $$S_T = \sum_{z \in Z} \|z - m\|^2 \text{ and } S_W \sum_{i=1}^{C} S_i = \sum_{i=1}^{C} \sum_{z \in Z_i} \|z - m_i\|^2.$$

28. The color image segmentation method according to claim 27, wherein d is an integer inclusive of and between 3 and 10.

29. The color image segmentation method according to claim 28, wherein the predetermined scale is a gray scale having values between 0 and 255.

30. The color image segmentation method according to claim 27, wherein the predetermined scale is a gray scale having values between 0 and 255.

31. The color image segmentation method according to claim 26, wherein the predetermined scale is a gray scale having values between 0 and 255.

32. The color image segmentation method according to claim 1, wherein the step (a) comprises the steps of:
   (a-1) defining a window which is centered at a pixel p and has a size of d×d when d is a positive integer, said window having a set of pixels Z; and
   (a-2) classifying a pixel position of each pixel of set Z into one of a C number of classes when i is a number between 1 and C; and
   (a-3) obtaining a J-value, as said first value, with respect to each pixel in a class-map as:

$$J = \frac{S_B}{S_W} = \frac{S_T - S_W}{S_W}$$

where $m_i$ is an average of positions of Ni data points in class $Z_i$, i=1 to C, and $$S_T = \sum_{z \in Z} \|z - m\|^2 \text{ and } S_W = \sum_{i=1}^{C} S_i = \sum_{i=1}^{C} \sum_{z \in Z_i} \|z - m_i\|^2.$$

33. The color image segmentation method according to claim 32, wherein d is an integer inclusive of and between 3 and 10.

34. The color image segmentation method according to claim 33, wherein the predetermined scale is a gray scale having values between 0 and 255.

35. The color image segmentation method according to claim 32, wherein the predetermined scale is a gray scale having values between 0 and 255.

36. The method according to claim 32 further comprising:
   (d) checking for effectiveness of segmentation of step (c) according to a result of $$\bar{J} = \frac{1}{N} \sum_{k} M_k J_k$$

where $J_k$ is the J value of a region k,
   $M_k$ is a number of pixel points in region k, and
   N is a total number of pixel points in the window.

37. The color image segmentation method according to at least one of claim 1, wherein the predetermined scale is a gray scale having values between 0 and 255.

38. An object-based color image processing method for processing a color image according to a color image segmentation method, wherein the color image segmentation method comprises the steps of:
   (a) calculating a first value representing a degree of difference between a pixel and peripheral pixels from the color of peripheral pixels based on a plurality of pixel values of an input image, wherein the color includes levels of one color;
   (b) obtaining a converted image by converting said first value into a value of a predetermined scale; and
   (c) segmenting the converted image based on a region growing method.

39. The color image processing method according to claim 38, wherein the color image processing method complies with the MPEG-7 standard.

40. A color image segmentation method for segmenting a color image into a plurality of regions, comprising the steps of:
   (a) quantizing pixel values of an image into a number of representative pixel values; (b) calculating a first value representing a degree of difference between a pixel and peripheral pixels from the color of pixels in a predetermined size window using quantized representative pixel values, wherein the color includes levels of one color;
(c) obtaining a converted image by converting said first value into a value of a predetermined scale; and
(d) segmenting the converted image using a segmentation method based on a region to growing method.

41. The color image segmentation method according to claim 40, wherein the step (b) comprises the steps of:
(b-1) defining a window B which is centered at a pixel p and has a size of d×d when d is a positive integer, said window having a set of pixels Z; and
(b-2) classifying a pixel position of each pixel of set Z into one of a C number of classes when i is a number between 1 and C, and
(b-3) obtaining a J-value as said first value with respect to each pixel in a class-map as:

$$J = \frac{S_B}{S_W} = \frac{S_T - S_W}{S_W}$$

where $m_i$ is the average of positions of $N_i$ data points in class $Z_i$, i=1 to C, and $$S_T = \sum_{z \in Z} \|z - m\|^2 \text{ and } S_W \sum_{i=1}^{C} S_i = \sum_{i=1}^{C} \sum_{z \in Z_i} \|z - m_i\|^2.$$

42. The color image segmentation method according to claim 41, wherein d is an integer inclusive of between 3 and 10.

43. The color image segmentation method according to one of claim 40 to claim 42, wherein the predetermined scale is a gray scale having values between 0 and 255.

44. A medium for storing program codes performing a color image segmentation method for segmenting a color image into a plurality of regions, wherein the medium comprises computer readable code means for:
(a) quantizing pixel values of an image into a number of representative pixel values;
(b) calculating a first value representing a degree of difference between a pixel and peripheral pixels from the color of pixels in a predetermined size window using quantized representative pixel values, wherein the color includes levels of one color;
(c) obtaining a converted image by converting said first value into a value of a predetermined scale; and
(d) segmenting the converted image using a segmentation method based on a region growing method.

45. The medium according to claim 44, wherein means (b) comprises computer readable code means for:
(b-1) defining a window which is centered at a pixel p and has a size of d×d when d is a positive integer and Z is a set of all pixels in said window; and
(b-2) classifying each pixel position of the set of pixels Z into one of a C number of classes when i is a number between I and C, and
(b-3) obtaining a J-value, as said first value, with respect to each pixel in a class-map as:

$$J = \frac{S_B}{S_W} = \frac{S_T - S_W}{S_W}$$

where $m_i$ is the average of positions of $N_i$ data points in class $Z_i$, i=1 to C, and $$S_T = \sum_{z \in Z} \|z - m\|^2 \text{ and } S_W \sum_{i=1}^{C} S_i = \sum_{i=1}^{C} \sum_{z \in Z_i} \|z - m_i\|^2.$$

46. The medium according to claim 45, wherein d is set as an integer inclusive of and between 3 and 10.

47. The medium according to one of claim 44 to claim 46, wherein the predetermined scale is a gray scale having values between 0 and 255.

48. The medium of claim 44 further comprising a computer readable means for:
(e) checking for effectiveness of segmentation of provided by means (d) according a result $$\overline{J} = \frac{1}{N} \sum_{k} M_k J_k$$

where $J_k$ is the J value of a region k,
$M_k$ is a number of pixel points in region k, and
N is a total number of pixel points in the window.

* * * * *